R. R. WINGER.
FISHING TOOL.
APPLICATION FILED NOV. 16, 1920.
1,411,546.
Patented Apr. 4, 1922.
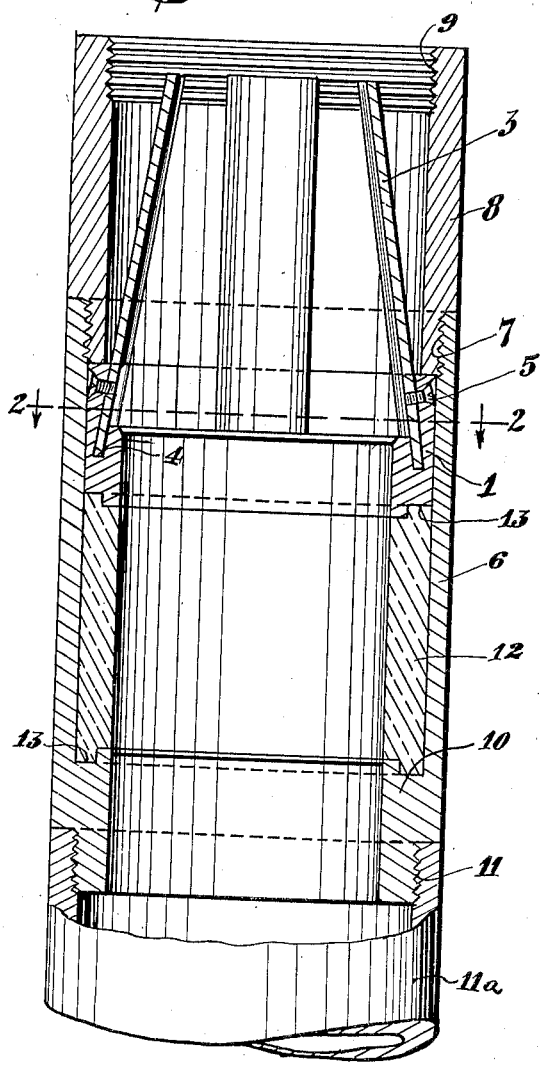
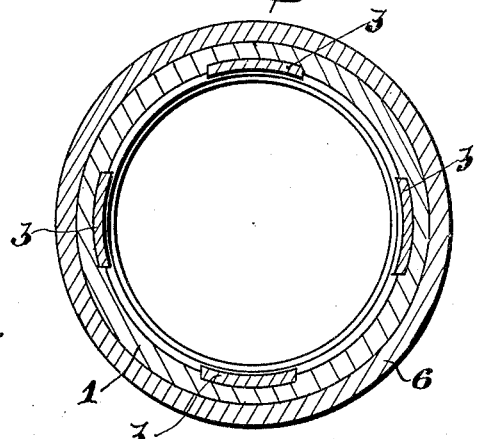
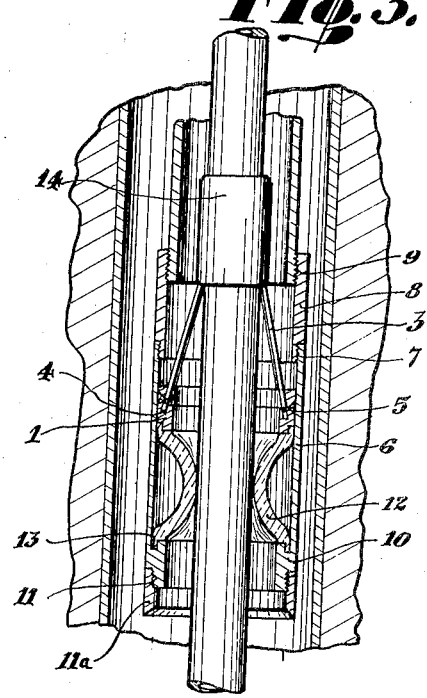
INVENTOR
Ralph R. Winger.
by Hazard & Miller
ATTYS.

UNITED STATES PATENT OFFICE.

RALPH R. WINGER, OF PLACENTIA, CALIFORNIA, ASSIGNOR TO REGAN FORGE AND ENGINEERING COMPANY, OF SAN PEDRO, CALIFORNIA, A CORPORATION OF CALIFORNIA.

FISHING TOOL.

1,411,546.  Specification of Letters Patent.  Patented Apr. 4, 1922.

Application filed November 16, 1920. Serial No. 424,483.

*To all whom it may concern:*

Be it known that I, RALPH R. WINGER, a citizen of the United States, residing at Placentia, in the county of Orange and State of California, have invented new and useful Improvements in Fishing Tools, of which the following is a specification.

This invention relates to fishing tools employed in the recovery of parts of well apparatus, and has for its object the provision of a fishing tool wherein means are provided for automatically closing the space within the fishing tool surrounding the member to be recovered when the latter is engaged by the fishing tool. By this arrangement, the liquid pumped into the well casing for loosening the material causing the broken member to stick, will be forced to flow through the bore of the broken member, since the space surrounding the same is closed, and as a consequence jets of liquid will be discharged through the end of the broken member for readily loosening the mud and the like holding the same.

The invention will be readily understood from the following description of the accompanying drawings, in which—

Figure 1 is a longitudinal section through the fishing tool.

Fig. 2 is a transverse section on the line 2—2 of Fig. 1.

Fig. 3 is a longitudinal section through a well casing and the fishing tool showing the operation of the latter.

The fishing tool comprises a sleeve 1 having an interior surface inclined as shown at 2 so that spring bars or dogs 3 received against said surface and projecting longitudinally upward will converge toward their upper free ends. The lower ends of these bars may be received in an annular groove 4 provided at the base of wall 2, and the bars may be detachably retained in position by means of screws 5 threaded through sleeve 1 and into the respective bars.

An outer sleeve 6 is received over sleeve 1 and extends longitudinally above and below the same. The upper end of this sleeve is internally threaded as shown at 7 so as to be connected to a usual tubing 8 which in turn is threaded as shown at 9 so as to be connected to a line of well tubing. The sleeve 6, in spaced relation below sleeve 1, is provided with an interior shoulder 10 in alinement with sleeve 1, and below said shoulder the sleeve 6 is threaded as shown at 11 so that it may have a usual end member 11$^a$ for a fishing tool secured thereto.

A resilient sleeve 12, preferably of rubber, is interposed between shoulder 10 and sleeve 1 and is seated at its respective ends in annular grooves 13 provided in shoulder 10 and in the sleeve 1. This resilient sleeve will normally yieldably urge the sleeve 1 upwardly against the end of tube 8.

In operation the fishing tool is lowered over the piece of well apparatus which it is desired to remove and the spring bars 3 engage beneath a collar 14 or other protuberance upon the broken member. The mud and the like within the well casing will tend to hold the broken apparatus against removal, and as a consequence it is necessary to flush out the well casing in order to remove the binding material.

In order to provide for the proper circulation of the flushing medium, the fishing tool is elevated slightly before forcing the liquid into the well casing. This elevation of the fishing tool will move sleeve 6 upwardly toward sleeve 1 which is held stationary through the engagement of dogs 3 beneath collar 14, and as a consequence the flexible sleeve 12 will be flexed, as clearly shown in Fig. 3, until it engages the broken well apparatus extending through the bore of the fishing tool. The space between the fishing tool and the broken apparatus within the same is thus closed by the flexible sleeve and the latter will form a practically leak proof joint around the broken apparatus.

When, now, the flushing liquid is forced into the well casing through the bore of the line of well tubing connected to the fishing tool, the passage between the broken member to be removed and the fishing tool is closed by sleeve 12, and as a consequence the liquid will be forced through the bore of the broken member. Jets of liquid will thus be discharged from the lower end of the broken member so as to dislodge the mud accumulated around the broken member. The circulation of this flushing medium is completed by the discharge of the same upwardly through the space between the fishing tool and the well casing.

The construction as thus described provides for the employment of the flushing medium at the lower end of the broken member where it will most efficiently dislodge the binding material tending to hold the broken member within the well casing.

Various changes may be made without departing from the spirit of the invention as claimed.

What is claimed is:

1. A fishing tool adapted to engage a piece of well apparatus for withdrawing the same, and means for closing the space between said well apparatus and the fishing tool.

2. A fishing tool adapted to engage a piece of well apparatus for withdrawing the same, and means for automatically closing the space between said well apparatus and the fishing tool through the engagement of the latter with the well apparatus.

3. A fishing tool adapted to be lowered over a piece of well apparatus for withdrawing the same, a sleeve slidable therein and adapted to engage the well apparatus, and a sleeve flexed by the movement of the first sleeve when engaging the well apparatus so as to close the space between said apparatus and the fishing tool.

4. A fishing tool adapted to be lowered over a piece of well apparatus for withdrawing the same, a sleeve slidable therein and adapted to engage the well apparatus, a second sleeve fixed to the fishing tool, a flexible sleeve between the said sleeves, and a sleeve flexed by the movement of the first sleeve when engaging the well apparatus so as to flex the same for closing the space between the apparatus to be withdrawn and the fishing tool.

In testimony whereof I have signed my name to this specification.

RALPH R. WINGER.